Patented June 16, 1953

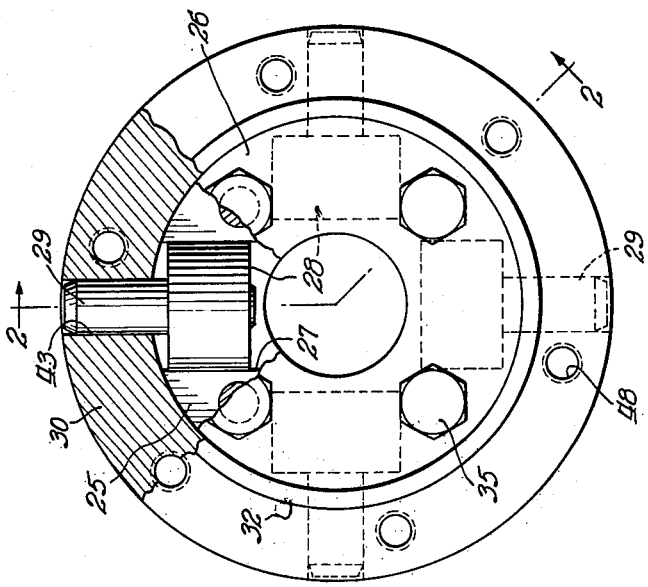
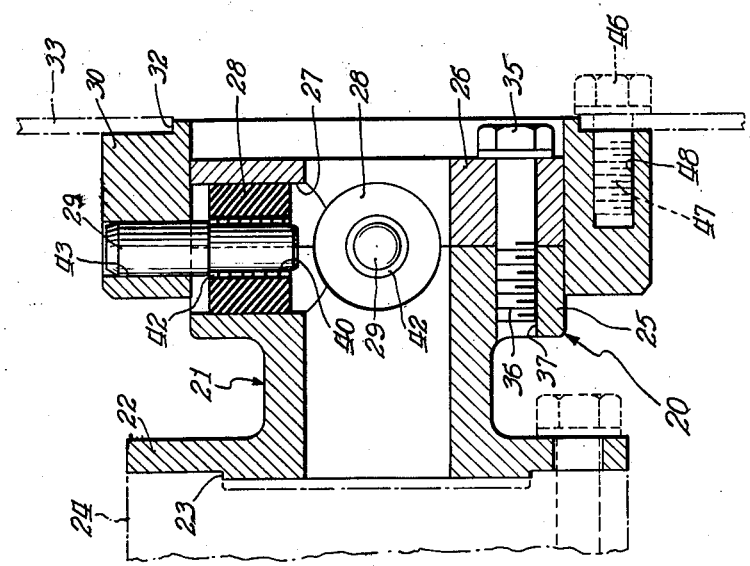

2,641,910

UNITED STATES PATENT OFFICE 2,641,910

FLEXIBLE MOUNTING FOR PROPELLER FANS

Earl F. Riopelle and Charles E. Hein, Detroit, Mich., assignors to Morse Chain Company, Ithaca, N. Y., a corporation of New York Application November 5, 1948, Serial No. 58,508

4 Claims. (Cl. 64—27)

This invention relates in general to flexible mountings and is particularly concerned with a flexible radial mounting for successfully driving and supporting a propeller fan such as employed on an automotive or truck engine.

Heretofore, fan mountings of this general class, with the fan running at high speeds, have been found particularly objectionable because of the vibrations set forth and transmitted through mechanisms adjacent the mounting.

The present invention seeks to overcome the deficiencies of the prior art fan mounting structures by the provision of a flexible fan mounting having incorporated therein not only the feature of quick and easy removability without disturbance to adjacent equipment but also having, among other features which will become apparent as the description proceeds, improved flexibility adaptable for more efficient operation of the contemplated flexible mounting structure in minimizing vibrations.

Accordingly, an object and accomplishment of the invention is to provide a flexible mounting for a propeller fan for automotive vehicles having improved resilient cushion members which effectively takes the wrap-up of torsional load and protects adjacent machine elements from shock, vibration and uneven impulses.

Another object and accomplishment of the invention is to provide a flexible mounting for a propeller fan wherein all parts are piloted so as to run true and concentric at high speeds without unbalanced forces.

The invention seeks, as a further object and accomplishment, to provide a flexible mounting for a propeller fan as contemplated herein and characterized by an arrangement of parts to more advantageously and satisfactorily perform the function required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and, as more particularly pointed out in the appended claims, reference being had to the accompanying drawing, which forms a part of this specification wherein:

Fig. 1 is an elevational view of the flexible mounting for propeller fans embodying the features of this invention and having parts thereof shown in section to more clearly illustrate the construction; and Fig. 2 is a sectional view of the flexible mounting for propeller fans depicted in Fig. 1, the section being taken substantially on the plane of the line 2—2 in Fig. 1.

The drawing is to be understood to be more or less of a schematic character for the purpose of illustrating and disclosing a typical or preferred form of the improvements contemplated herein, and in the drawing like reference characters identify the same parts in the several views.

In the exemplary embodiment of the invention depicted in Figs. 1 and 2, we have illustrated a flexible mounting and drive for propeller fans as contemplated herein and designated in its entirety by the numeral 20 as comprising, in general, a body member 21 having a flange 22 provided with a pilot 23 adaptable for removable securement of the body 21 to a driving media 24, said body 21 being made in two parts 25 and 26 which are disposed in confronting relationship on the center line of apertures as at 27 in which there are respectively disposed resilient blocks as at 28 adapted respectively to receive trunnion pins as at 29 which are operatively associated with a ring member 30 suitably piloted on the outside diameter of the body 21, said ring member having pilot means as at 32 for advantageous securement of the propeller fan blades as at 33.

In accordance with the construction of the present invention, the body 21 may be cast by any suitable conventional means presently known and employed to define the form and shape as illustrated. After casting of the body 21 the apertures as at 27 are bored and finished, said apertures being disposed on center lines at right angles one to the other. Preferably, four apertures as at 27 are provided, each having an identical flexible assembly associated therewith.

In Fig. 2, it can be seen that the part 26 of the body member 21 is removably secured to the part 25 by means of the bolts as at 35 which bolts have threaded portions 36 adaptable to be received into suitably threaded apertures as at 37 disposed radially in the part 25 of the body member 21. With this construction, advantageous assembly of the resilient blocks as at 28 in their operative position is provided, the blocks 28 in their assembled relationship with the trunnions 29 being placed in the half of the aperture 27 disposed in the part 25 and then the part 26, wherein the other half of the aperture 27 is disposed, is advantageously placed into position and removably secured in such position by tightening of the bolts 35.

It is notable that the coupling contemplated herein may be advantageously disassembled without disturbance of adjacent parts by merely loosening the bolts as at 35 and removing the part 26 from its normal assembled position. This operation will expose the resilient members for replacement or repair purposes.

The muscle-like flexible blocks 28 are designed for uniform stress and linear deflection, all relative movement being accommodated by controlled displacement of the compressed rubber. Preferably, the blocks 28 are formed of rubber, or may be formed of any other material having like characteristics to those of rubber, to define a circular shape having a central aperture 40 to receive portions of the trunnion 29. As a flexible block core there is provided a metallic screen 42 which, through impregnated bonding with the rubber, permits a heavy press fit to the trunnion 29 which is assembled under pressure into the metallic flexible block core, this machine trunnion, after assembly, being integral with the entire flexible block assembly.

It is notable that portions of the trunnion 29 projecting outwardly of the flexible blocks 28 are received into the aperture 43 disposed in the ring member 30.

As illustrated in Fig. 2, the fan blades 33 may be advantageously secured to the ring member 30 by means of suitable bolts 46 having threaded formations 47 adaptable to be received into suitable threaded apertures 48 disposed in the ring member 30.

The path of the load is from the fan, to the ring, thereafter to the pins, and through the flexible blocks to the body fixed to the driving engine. It is notable that all parts are held concentric by positive pilots and that the fan mounting is torsionally flexible. Moreover, because the blocks are in the radial position as disclosed, the thrust capacity is great. The mounting contemplated by this invention requires no lubrication which is also of major importance in this construction.

From the foregoing disclosure, it can be seen that we have provided a flexible mounting and drive for propeller fans which efficiently fulfills the objects thereof as hereinbefore set forth and provides numerous advantages which may be summarized as follows:

1. Structurally simple, efficient and durable;
2. Economical to manufacture and readily adaptable to mass production manufacturing principles; and
3. The provision of a flexible coupling for propeller fans having incorporated therein not only the feature of quick and easy removability without disturbance to adjacent equipment but also having improved flexibility adaptable for more efficient operation of the contemplated flexible mounting in minimizing vibrations due to fan rotation.

While we have illustrated a preferred embodiment of our invention, many modifications may be made without departing from the spirit of the invention, and we do not wish to be limited to the precise details of construction set forth, but wish to avail ourselves of all changes within the scope of the appended claims.

We claim:

1. A drive coupling comprising a generally cylindrical driving member formed of two confronting coaxial sections having cylindrical outer surfaces and adapted for axial separation one from the other; means releasably securing said sections together whereby a continuous outer cylindrical surface is provided on said driving member; means defining opposed recesses in the proximate faces of said sections providing radial pockets in said driving member; a ring detachably mounted on the outer periphery of said driving member and having therein a plurality of radial apertures normally in axial alignment with said radial pockets, said driving member and ring being adapted for relative rotative movement one with respect to the other; a driven member anchored to said ring whereby said driven member is supported on said driving member; and a plurality of torque transmitting unitary assemblies connecting said driving member to said ring, each comprised of a structurally independent radial trunnion pin having its outer region positioned in an aperture in said ring and its inner region extending radially inward into an aligned pocket of said driving member; a resilient annular block seated in the aforesaid driving member pocket; and the section of said driving member nearest said driven member being adapted to be moved as a unit in a direction axially away from the other section thereby to permit ready access to said torque transmitting assemblies.

2. A driving coupling comprising a generally cylindrical driving member formed of two coaxial confronting sections of annular contour and adapted for axial separation one from the other; means releasably securing said sections together whereby a continuous outer cylindrical surface is provided on said driving member; means defining opposed recesses in the proximate faces of said sections providing radial pockets in said driving member; a plurality of torque transmitting unitary assemblies each comprising a structurally independent radial trunnion pin the inner region of which is arranged in a pocket in said driving member; and a resilient annular block seated in the aforesaid driving member pocket in surrounding relation to the inner region of said pin; in combination with a ring detachably superimposed on the outer cylindrical surface of said driving member sections for support thereon, and said ring having therein a plurality of radial apertures for receiving the outer regions of said trunnion pins; and a driven member anchored to said ring whereby said driven member is supported on said driving member, said ring and the section of said driving member which is nearest said driven member being axially removable with said torque transmitting assemblies as a unit for ready access to said assemblies.

3. In a flexible mounting and drive coupling the combination of, a cylindrical body member having means for removably securing the body to a driving media, said body being made in two parts detachably disposed in confronting relationship each to the other and having a plurality of radial apertures, resilient blocks each respectively disposed in an aperture, a driven ring member suitably piloted on the outer circumference of said body member and having a plurality of radial apertures in central registry with the radial apertures of said body, and structurally independent trunnion pins each having a radially inward portion operatively associated with a respective resilient block and having a radially outward portion projecting in said apertures of said ring member for drivingly connecting said members and detachably securing said ring to said cylindrical body member, said ring, blocks, pins and one of the parts of said body member being removable as a unit from the other body member part for ready access to said blocks.

4. A drive coupling comprising a two-part driving member comprised of a generally cylindrical body having radial recesses in an end face, and a removable disc-like plate arranged in confronting relationship to the recessed end face of said body and having radial recesses aligned with said body recesses, the recesses in said body and plate together defining a plurality of cylindrical radially arranged pockets; means removably securing said disc-like plate to said body; a driven ring member surrounding said drive member and extending across the outer ends of said pockets and having a plurality of radial apertures in central registry with said radially arranged pockets; resilient annular blocks fitted into said pockets; structurally independent radial studs projecting into said radial apertures of said driven ring member and having portions extending radially inwardly into said blocks, thereby drivingly connecting said cylindrical drive member to said driven ring member and detachably securing said ring member to said drive member; and said plate, ring, blocks and studs being adapted for removal as a unit from said cylindrical member for ready access to said blocks.

EARL F. RIOPELLE.
CHARLES E. HEIN.

References Cited in the file of this patent

UNITED STATES PATENTS

| Number | Name | Date |
|---|---|---|
| 427,103 | Morgan | May 6, 1890 |
| 2,154,385 | Reising | Apr. 11, 1939 |
| 2,181,183 | Guy | Nov. 28, 1939 |

FOREIGN PATENTS

| Number | Country | Date |
|---|---|---|
| 493,219 | Great Britain | Oct. 5, 1938 |

OTHER REFERENCES

Product Engineering, December 1946.